(12) United States Patent
Lindskog et al.

(10) Patent No.: US 6,665,262 B1
(45) Date of Patent: *Dec. 16, 2003

(54) DISTRIBUTED FAULT MANAGEMENT ARCHITECTURE

(75) Inventors: Peter Lindskog, Linköping (SE); Jan Oom, Rimforsa (SE); Michael Ragnar, Ljungsbro (SE)

(73) Assignee: Telefonaktiebolaget LM Ericsson (publ), Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/250,193

(22) Filed: Feb. 16, 1999

(51) Int. Cl.$^7$ ............... H04J 3/14; G06F 13/00
(52) U.S. Cl. ................ 370/216; 370/242
(58) Field of Search ............... 370/242, 216, 370/217, 218, 241, 244, 250; 709/223, 201; 714/25

(56) References Cited

U.S. PATENT DOCUMENTS

| | | | | |
|---|---|---|---|---|
| 5,655,081 A | | 8/1997 | Bonnell et al. | 395/200.32 |
| 5,740,357 A | | 4/1998 | Gardiner et al. | |
| 5,784,359 A | * | 7/1998 | Bencheck et al. | 370/244 |
| 5,787,074 A | * | 7/1998 | Brownmiller et al. | 370/244 |
| 5,978,594 A | | 11/1999 | Bonnell et al. | 395/837 |
| 6,052,722 A | * | 4/2000 | Taghadoss | 709/223 |
| 6,233,610 B1 | * | 5/2001 | Hayball et al. | 709/223 |
| 6,349,325 B1 | * | 2/2002 | Newcombe et al. | 706/10 |
| 6,370,572 B1 | * | 4/2002 | Lindskog et al. | 709/223 |
| 6,373,383 B1 | * | 4/2002 | Arrowsmith et al. | 340/506 |

FOREIGN PATENT DOCUMENTS

WO    WO 97/07638    2/1997

OTHER PUBLICATIONS

Garijo, M., et al.: "A Multiagent System for Cooperative Network–Fault Management"; *Proceedings of the International Conference on the Practical Application of Intelligent Agents and Multi–Agent Technology*, Apr. 1996, pp. 279–294.

Day, C., et al.: "Subnetwork Root Cause Alarm Analysis—An Element Management Layer (EML) Operations Application"; *Proceedings of the Network Operations and Management Symposium*, Feb. 1994, pp. 343–357; *Institute of Electrical and Electronics Engineers*, 1994, p 343, 345.

Schmidt, S.: "Management (Operation & Maintenance) Von GSM Base Station Sybsystemen"; *ITG–FachberichteI*, Jan. 1, 1994, pp. 445–456.

Maynard–Smith, T.: "The Network Management domain"; *ICL Technical Journal*, Nov. 1, 1991, pp. 763–779.

EPO Standard Search Report mailed Sep. 10, 1999.

"Preparation of Function Charts for Control Systems"; IEC 848, technical report, 1998.

* cited by examiner

*Primary Examiner*—Chau Nguyen
*Assistant Examiner*—Soon-Dong Hyun

(57) ABSTRACT

A system and method for distributing the fault management functions throughout a communications network. Each node in the network includes an associated fault agent/configuration agent pair. The fault agent receives alarm information and correlates the alarm information to identify a cause of a fault in the network. The fault agent then determines if correction of the fault can be handled at the current node. If so, the fault agent passes information identifying the fault to the associated configuration agent, which generates reconfiguration data for handling the fault and sends the reconfiguration data to subordinate nodes for implementation. If, on the other hand, the fault agent determines that the fault cannot be handled at the current node, the fault agent passes the alarm data, in summary form, to a higher level fault agent/configuration agent pair for handling at that higher level or for further processing and passing the data up the network until a level is reached at which the fault can be handled.

19 Claims, 6 Drawing Sheets

DISTRIBUTED FAULT MANAGEMENT ARCHITECTURE

RELATED APPLICATIONS

This application is related by subject matter to commonly-assigned U.S. patent application Ser. No. 09/148,394, entitled "Distributed Communications Network Management and Control System," filed Sep. 4, 1998, which is incorporated by reference herein in its entirety.

BACKGROUND OF THE INVENTION

1. Technical Field of the Invention

The present invention relates in general to the communications field and, in particular, to a system and method for distributing control of the fault management functions throughout a communications network.

2. Description of Related Art

The tasks of managing and controlling the performance of distributed communications networks (e.g., distributed data networks or distributed telecommunications networks) are becoming increasingly complex due to a number of crucial factors, such as, for example, the increased complexity, dynamism and diversity of the network technologies, the spread of advanced services with very distinct requirements (e.g., live video, file transfers, etc.), and the heightened expectations of the users being served. Other crucial factors that impact network complexity are the progressive deregulation of the telecommunications industry, and the highly competitive market that has emerged as a result.

In order to survive in such an environment, a distributed communications network operator must manage the network so that its utilization is maximized (i.e., ensure a maximum return on the investment), while ensuring that all offered services perform within expected bounds. In order to perform such tasks, the operator's personnel need certain support tools that help them to manage the tasks with their complexities. In particular, certain distributed, dynamically changing networks, such as, for example, the next generation Internet and so-called third generation mobile communication networks will require a level of operational support that is not provided by today's support systems.

Operation and Support Systems (OSS) typically function to perform routine support tasks in data communications and telecommunications systems, such as, for example, traffic measurements, network supervision and performance management, analyses, fault diagnoses, administrative tasks, etc. The current approach used for network performance and fault management in the OSS industry typically involves a number of applications residing on a software platform. The software platform usually supports separate applications for monitoring network performance information, managing alarm conditions, and handling of common functions in order to initiate management operations for network resources. Normally, these applications are not integrated to a great extent, other than that they share the same platform facilities. Consequently, it is the operator who has to correlate the performance and alarm information, and where necessary, decide what actions are appropriate to take with regard to improving network performance.

As such, most of the support systems involved are centralized in a single, monolithic management center, or in some cases, distributed or spread across a relatively small number of geographically distinct management centers. In some of the distributed system cases, the main reason for the distribution is the distributed nature of the responsibilities in the corporate organizations involved.

Currently, in a typical telecommunication system, the network element of the system gathers statistics about the traffic it is handling over a five or fifteen minute interval. The network element then makes this information available to the system as an output file, or stores it locally for later retrieval. As such, two of the original motives for structuring the telecommunication system performance measurement activities in this way were to minimize the sheer volume of information generated, and reduce the network element's processor load. Typically, the performance information is retrieved by a network element's management system, and stored in a database from which performance reports can be generated, either periodically or on demand. The result, however, is that network performance information is not available in real time.

Detailed fault information (e.g., alarms), for both hardware and software faults, is also gathered by the various network elements and is sent up to a centralized fault management node, which is responsible for alarm filtering and alarm correlation. The central fault management node is also used to suggest actions to correct or to otherwise reduce the effect of the faults in response to an alarm or to a combination of alarms. In some cases, more or less intricate knowledge-based systems are sometimes designed to aid the operator with fault diagnosis. Existing fault management systems, however, generally rely upon operator input and are incapable of automatically correcting the faults or of reconfiguring the managed system, if needed. Moreover, because fault information is not available in real time and because the fault management process relies upon operator input, fault management systems are generally unable to react to and handle faults in real time.

Data and telecommunication networks are becoming increasingly complex to manage in terms of their scale, the diversity of the networks and services they provide, and the resulting voluminous amount of information that must be handled by the fault management system. In order to address these complexities, certain semi-automated and automated fault management solutions will be needed to support a network operator's staff. Such support capabilities actually do not exist (to any significant extent) in the fault management solutions provided today.

Specifically, today's fault management systems effectively introduce an inherent latency or delay in the availability of alarms and other fault information. Consequently, these delays effectively limit the ability of network managers to respond to faults within their networks. Clearly, in operating dynamic telecommunication networks such as cellular networks, Internets, and broadband multi-media networks, these delays in identifying and resolving network faults are unacceptable. Furthermore, as the network fault management systems become increasingly automated, such delays in the delivery of fault information will become increasingly unacceptable. Instead, the fault detection intervals used should be dictated by the timing requirements of the problem domain, rather than by the solutions the network elements provide today.

In addition, today's telecommunication network management systems are deployed in a relatively small number of locations in the network. In other words, the fault management functions are centralized in a small number of network nodes. Although it might theoretically be possible to build real-time capabilities into a centralized management system, there are some problems that would exist in such a system. First, unacceptably large amounts of bandwidth is consumed by the alarm information that must be sent to the highest level of the fault management system. The large volume of alarm data that can be generated as the size of the communications system increases will also tend to cause the central processing of such data to become slow. Another problem with maintaining all of the fault management functions at a fully centralized operation and management (O&M) system is that the system lacks robustness; if the centralized O&M system breaks down, handling of fault management tasks will be suspended.

SUMMARY OF THE INVENTION

The present invention comprises a system and method for performing distributed fault management functions in a communications network. The communications network includes a plurality of nodes. In a cellular telecommunications network, for example, the nodes are usually arranged in a hierarchy and can comprise physical devices, such as base stations, radio network controllers, radio network managers, and the like. In accordance with the present invention, each node generally includes a fault agent and an associated configuration agent. In addition, each node can also be used to supervise one or more network resources, which can comprise logical resources (e.g., a cell border, a location area, etc.) and/or physical devices.

As faults are detected in the communications network, alarms are sent from one node to the next by the fault agents that reside in the various nodes. In particular, when a fault agent receives alarm data, either from a subordinate fault agent or from a network resource, the fault agent analyzes the received alarm data to identify a cause of the alarm and to determine if the underlying fault that caused the alarm can be handled at the current node. If not, then the fault agent produces a new alarm, which summarizes the received alarm data, and passes the new alarm to an interconnected fault agent.

Once the alarm data reaches a fault agent at which the underlying fault can be handled, the fault agent forwards the fault information to the associated configuration agent. The configuration agent processes the fault information to generate reconfiguration data for correcting or otherwise reducing the effect of the fault and sends the reconfiguration data to a network resource (ordering it to perform some action), or to at least one subordinate configuration agent, depending on which nodes are affected by the proposed reconfiguration. Each subordinate configuration agent that receives the reconfiguration data generally performs further processing to generate more detailed reconfiguration data, which is then passed on to even lower level configuration agents or to underlying network resources. This process repeats until the reconfiguration is fully implemented.

Preferably, the fault agents include an event receiver for receiving alarm data from subordinate fault agents or from underlying network resources and an event generator for performing alarm correlation and alarm filtering functions to identify the cause of the alarm (i.e., the underlying fault). When the event generator identifies the cause of a particular alarm or set of alarms, the event generator updates the fault information in an event database, and, as a result, the event dispatcher sends the fault information to the associated configuration agent (if it is determined that the current node can handle the fault) or to a supervising fault agent, as higher level alarm data (if it is determined that the current node cannot handle the fault).

Similarly, the configuration agents include an event receiver for receiving both fault information from associated fault agents and high level reconfiguration data from higher level configuration agents. The configuration agents further include an event generator for generating the reconfiguration data necessary to reduce the effect of a detected fault and for generating more detailed reconfiguration data from the high level data that is received from supervising configuration agents. Once the reconfiguration data is generated, the event generator updates the configuration information that is stored in an event database, and, as a result, the event dispatcher sends the updated configuration information to the subordinate configuration agents and/or to underlying network resources for implementation.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
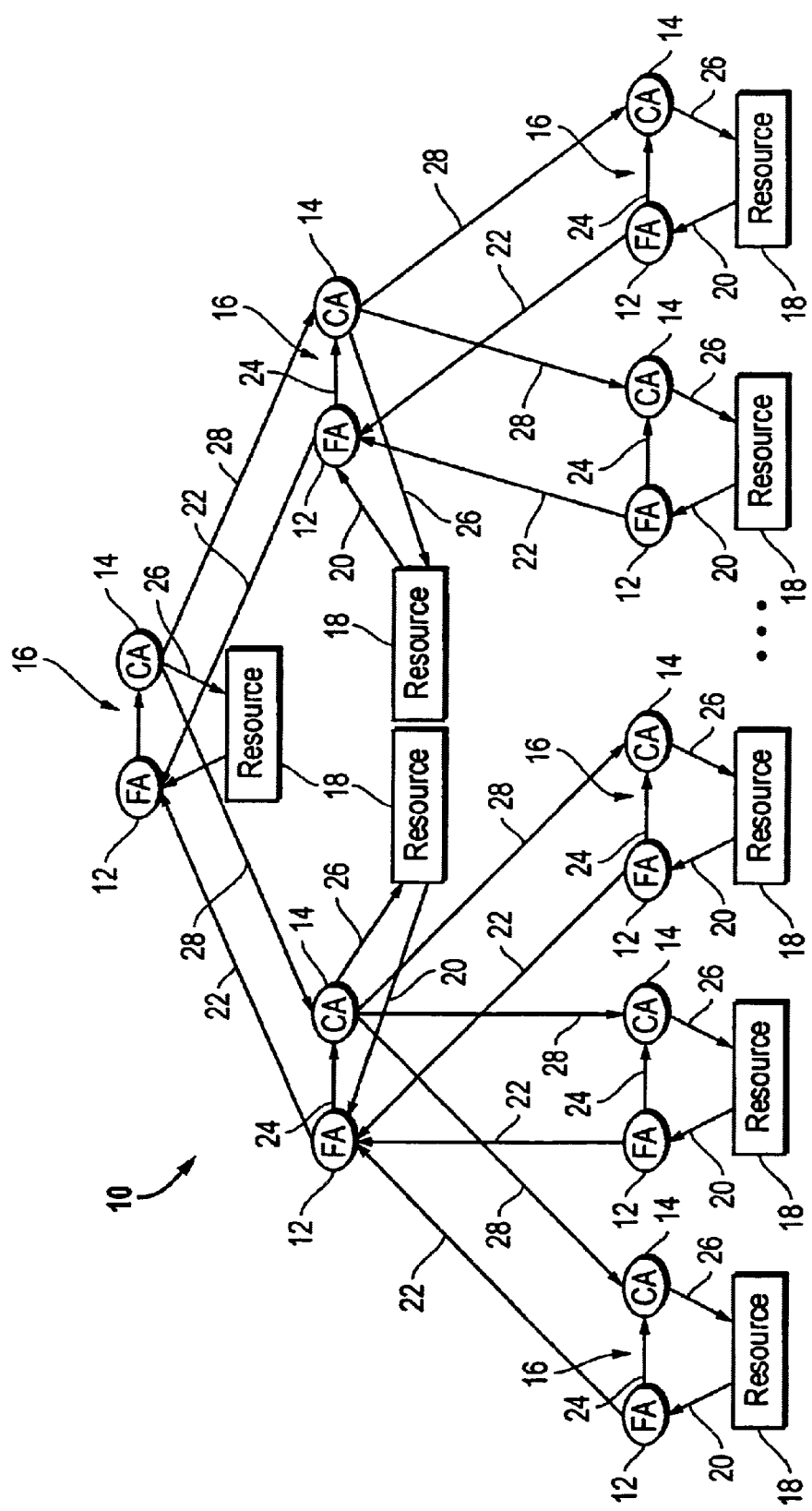
FIG. 1 is a simplified diagram of the distributed fault management system of the present invention.

Reference is now made to the Drawings wherein like reference characters denote like or similar parts throughout the various Figures.

The present invention comprises a distributed fault management architecture that is similar to the Real-Time Performance Management system disclosed in pending U.S. patent application Ser. No. 09/148,394, filed Sep. 4, 1998. In particular, the distributed fault management architecture of the present invention decentralizes the fault management operations and increases the robustness of the fault management system, while permitting faults to be addressed in real time. Essentially, fault management capabilities are distributed throughout the various levels of a communications network. Maximum efficiency is then achieved by performing fault processing, and making necessary corrections, at the lowest possible level. In addition, the decentralization of the fault management operations allows scalability (i.e., the ability to continue operations as new equipment or levels are added to the network) of the system to a much larger degree than with a centralized fault management solution.

Referring now to FIG. 1, there is illustrated a simplified diagram of the distributed fault management system 10 of the present invention. The system 10 includes any number of fault agents (FA) 12 and configuration agents (CA) 14 operating on different levels. Usually, the FAs 12 and CAs 14 are arranged in pairs. These FA-CA pairs 16 can be associated with a particular device, such as a radio network controller or radio network manager in a cellular system, or with a logical entity, such as a cell-pair or a location area. Each FA-CA pair 16 supervises one or more underlying network resources 18 and/or subordinate FA-CA pairs 16. The lowest level of the system 10 is assumed to be a network resource 18 such as a single circuit in a cellular base station, for example, while the highest level of the system 10 typically is the network operator.

Each FA 12 receives alarms, or events, from its associated network resources 18 (as indicated at 20) or from its subordinate FAs 12 (as indicated at 22). These alarms are used to identify faults that occur in the system 10, so that corrective actions can be taken. The receiving FA 12 then decides whether the alarm can be handled on the current level or if it must be forwarded (as indicated at 22) to the next higher agent level. Higher level FAs 12 (and CAs 14) are also able to draw conclusions based on information from only a subset of its subordinate FAs 12. Thus, the system 10 will continue to operate even when some of the subordinate agents are inaccessible, thereby increasing the robustness of the fault management system 10.

Alarms that are generated in the network resources 18 are time-stamped. For these time-stamps to be meaningful, it is preferable that the communications network and the fault management system 10 have the same apprehension of time, which can be achieved, e.g., by using a time synchronization protocol, such as the network time protocol (NTP). NTP, as well as other time synchronization protocols, is well known to those of ordinary skill in the art. As a result, certain alarm sequences, or specified groups of alarms that occur within a particular interval, can be correlated by the receiving FA 12 (or CA 14). Alarm correlations can be used to determine the actual cause of the fault. Moreover, alarm correlations can be used by an FA 12 at a particular level to derive only one alarm, or a small set of alarms, that symbolize the received alarm sequence. Thus, instead of passing on all alarms received by an FA 12, this single alarm (or a small set of alarms) is then forwarded to the next higher FA 12 or to a CA 14. The system 10 thereby supports scalability, or in other words, new levels can be easily added to the system without requiring large amounts of bandwidth to transport multiple alarms from the subordinate FAs 12. Instead, a particular alarm sequence received from subordinate FAs 12 can be represented by a single alarm for transmission to higher level FAs 12.

Alarms that are to be handled at the current level are delivered to the associated CA 14 of the FA-CA pair 16 (as indicated at 24). Each CA 14 is assumed to be able to initiate the proper corrective measures or to implement appropriate system reconfigurations in response to the received alarm. These measures and reconfigurations can be in response to a single received alarm or, using alarm correlation, to a specific sequence or group of received alarms. In addition, the corrective measures and reconfigurations can include the performance of complicated calculations (e.g., involving various planning algorithms in knowledge-based systems) that affect a number of underlying resources 18 or can be very simple, such as a decision not to act at all (i.e., a simple type of alarm filtering). Once the appropriate corrective measures and system reconfigurations are determined by the CA 14, corresponding instructions are sent from the CA 14 to the underlying network resources 18 (as indicated at 26) and/or to the subordinate CAs 14 (as indicated at 28), depending on where corrective actions are needed. Upon receipt of such instructions at a subordinate CA 14, additional processing can be performed, with any additional instructions being sent to the underlying resources 18 (as indicated at 26) and/or to even more subordinate CAs 14 (as indicated at 28).

In order to maintain coordination of the fault management operations in the preferred embodiment, alarm information is not indiscriminately passed from an FA 12 to its associated CA 14 (as indicated at 24) or to its supervising FA 12 (as indicated at 22). Instead, each FA 12 (or CA 14) first sends a subscription request to a subordinate FA 12 (or associated FA 12) individually subscribing to specific events (i.e., alarms) so as to obtain maximum flexibility. Using this subscription process, the FA 12 informs the subordinate FA 12 which alarms are of interest to the operating network at a particular time (e.g., for this hour). Thus, the subordinate FA 12 only forwards alarm information to agents that have requested such information through a subscription request. This function avoids the consumption of bandwidth for sending data that are not relevant for the moment. This can also be thought of as an alarm filtering operation.

Figure 2:
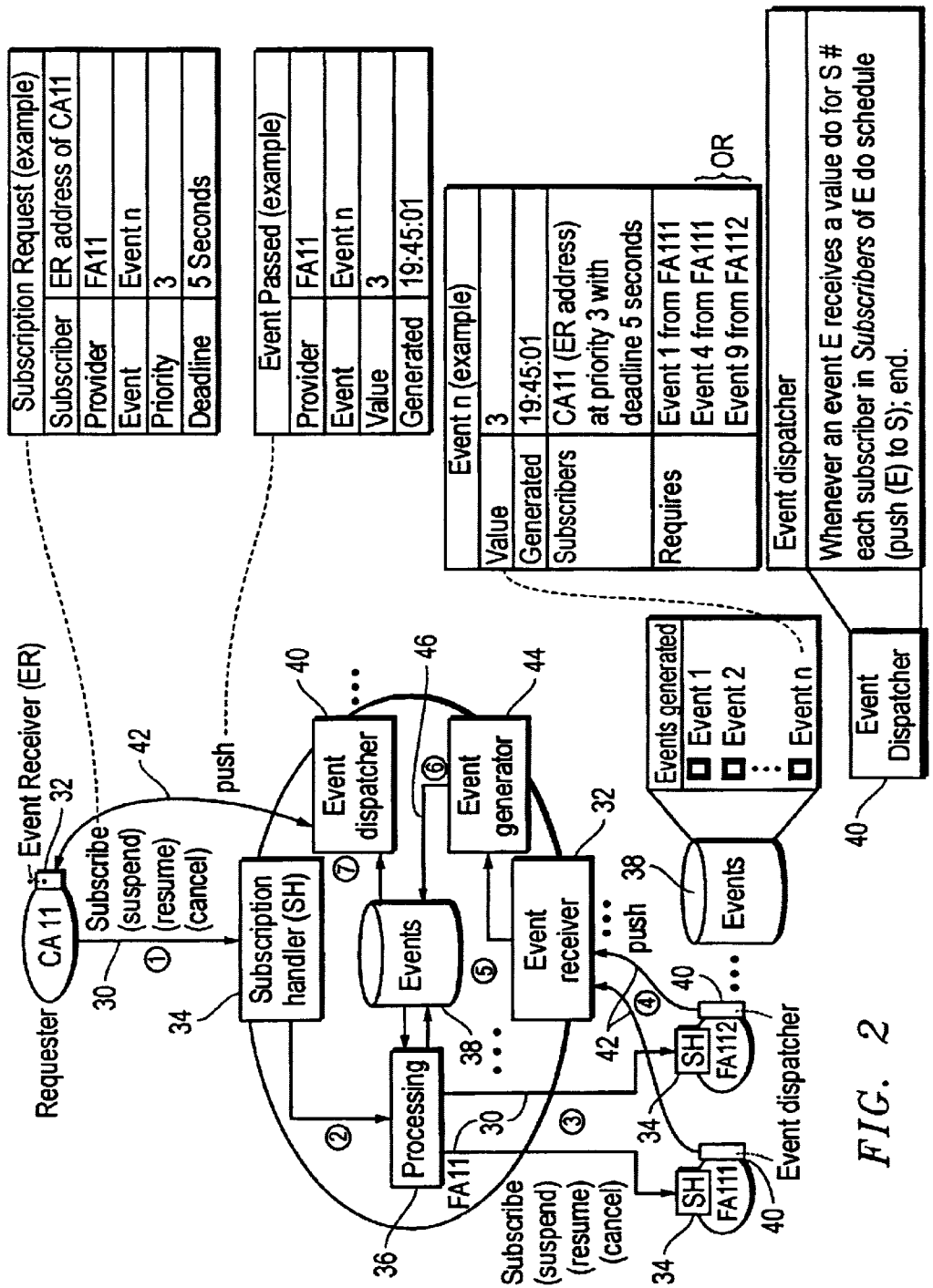
FIG. 2 is a diagram illustrating the preferred operation of a fault agent (FA) in accordance with the present invention.

Referring now to FIG. 2, there is shown a diagram illustrating the preferred operation of an FA 12 in accordance with the present invention. First an agent 12 or 14, in this case CA11, that desires event information from network resources 18 or other agents 12 or 14 (CA11's associated fault agent FA11 in this case) subscribes to event data from FA11 by sending one or more subscription requests to FA11 (as indicated at 30). The subscription request, as shown in its inset view, contains: (1) a pointer to an event receiver 32 of the requesting agent, here CA11 (used as a subscriber address); (2) an identification of the event for which information is requested (Event n in this example); (3) the priority of receiving the event information (e.g., 1 to 10, with 1 being the highest priority); and (4) a deadline indicating the latest time at which the event information should be passed. After a subscription request is made, the requesting agent can suspend the request, resume the request (once suspended), or cancel the request.

The subscription request is received at the receiving agent FA11 by a subscription handler 34, which acts as an interface to the requesting agent CA11. The subscription handler 34 immediately passes the request to a processing unit 36. Optionally, the subscription handler 34 can send an acknowledge message back to the requesting agent CA11 to indicate that the subscription was successfully set up.

The processing unit 36 interacts with an events database 38 to determine what actions need to be taken to properly respond to the request. The events database 38 contains event records for all of the possible events that may occur at agent FA11. Each event record, as shown in the inset view of Event n, contains: (1) a value for that event (e.g., providing refined event information, indicating the number of times the event has occurred, and so on) (2) an indication of the time at which the event was last generated (i.e., occurred); (3) a list of current subscribers (ordered according to the subscribers' importance, which is a function of the above-mentioned priority and deadline information); and (4) a listing of the required input events (i.e., from subordinate FAs 12) to be able to generated the event in question.

The listing of requirements is input by the operator or application designer and defines a part of the event; the logic is the other part that defines an event. For example, in accordance with the scalability concept discussed above (i.e., where the forwarding of a single alarm from an FA 12 can be used to indicate that multiple alarms have been received at that FA 12), a particular requested event might require the occurrence of three different events at certain subordinate FAs 12. In other cases, the requested event might merely require the existence of a specific occurrence at the FA 12 or network resource 18 that receives the request.

Referring again to the example depicted in FIG. 2, after receiving the subscription request, the processing unit 36 inserts an identification of the subscriber CA11 into the subscriber field of the event record for Event n. If other agents 12 or 14 have also subscribed to the event, the position of the subscriber data of CA11 in the subscriber list is determined by the subscription request's priority and deadline according to a predetermined scheduling policy.

Furthermore, Event n of FA11 in this example requires the occurrence of three other events: Event 1 from the subordinate FA111 and either Event 4 from the subordinate FA111 or Event 9 from the subordinate. FA112. The processing unit 36 retrieves this information from the event database 38 and sets up three subscriptions that correspond to these three required events. Thus, two subscription requests (for Events 1 and 4) are sent to the subscription handler 34 for the subordinate agent FA111 and one subscription request (for Event 9) is sent to the subscription handler 34 for the subordinate agent FA112. The subordinate agents FA111 and FA112 have the same elements and construction, and operate in essentially the same manner, as the FA11; the difference is in the event definitions, which are done per application, and the associated logic. As will be appreciated, the priority and deadline information in the subordinate subscription requests is set to ensure that the requested event information is received in time to fulfill the deadline for Event n of FA11; "too old" events will simply not be passed on by the providing agent. It will be further understood that the subordinate FAs 12 (see FIG. 1) might also generate subscription requests for their subordinate FAs 12.

When an event occurs in a subordinate FA 12 before the specified deadline, that FA 12 transmits the event from its event dispatcher 40. Generally, each time the event record is updated (by updating the value field and inserting a new time in the time generated field), the event dispatcher 40 sends out (pushes) the event to each of the agents 12 or 14 that are listed in the subscriber field of the event record (as generally indicated at 42); The event is sent to the subscribers 12 or 14 in the order they are listed (i.e., in their order of importance). The event queue of the dispatcher 40 is cleared as the event is sent to each subscriber 12 or 14.

After the event is pushed to the subscriber 12 or 14 (as indicated at 42), the event is received at the subscriber's event receiver 32. The event receiver 32 immediately forwards the event to event generator 44 of the requesting agent 12 or 14. In essence, the event generator 44 is the intelligence of the agent 12 or 14. The event generator 44 consumes the received events, one after another, and performs event filtering and correlation. In other words, the event generator 44 keeps track of whether the requirements for a particular event have been fulfilled. This event generator process can be performed in many ways. For example, in EHPT's centralized Fault Management expert (FMX) system, a graphical rule-based if-then language is used to perform event filtering and correlation. In the preferred embodiment, the event generator 44 employs a technique that uses so-called function charts, typically referred to as the GRAFCET formalism. GRAFCET is an IEC standard for sequential control, it supports high-level hierarchical control design, and by its graphical appearance, it is easy to configure and understand. In addition, because GRAFCET is particularly well suited for control applications, it can be used both for event filtering and correlation (in FAs) and for configuration control (in CAs).

Figure 3:
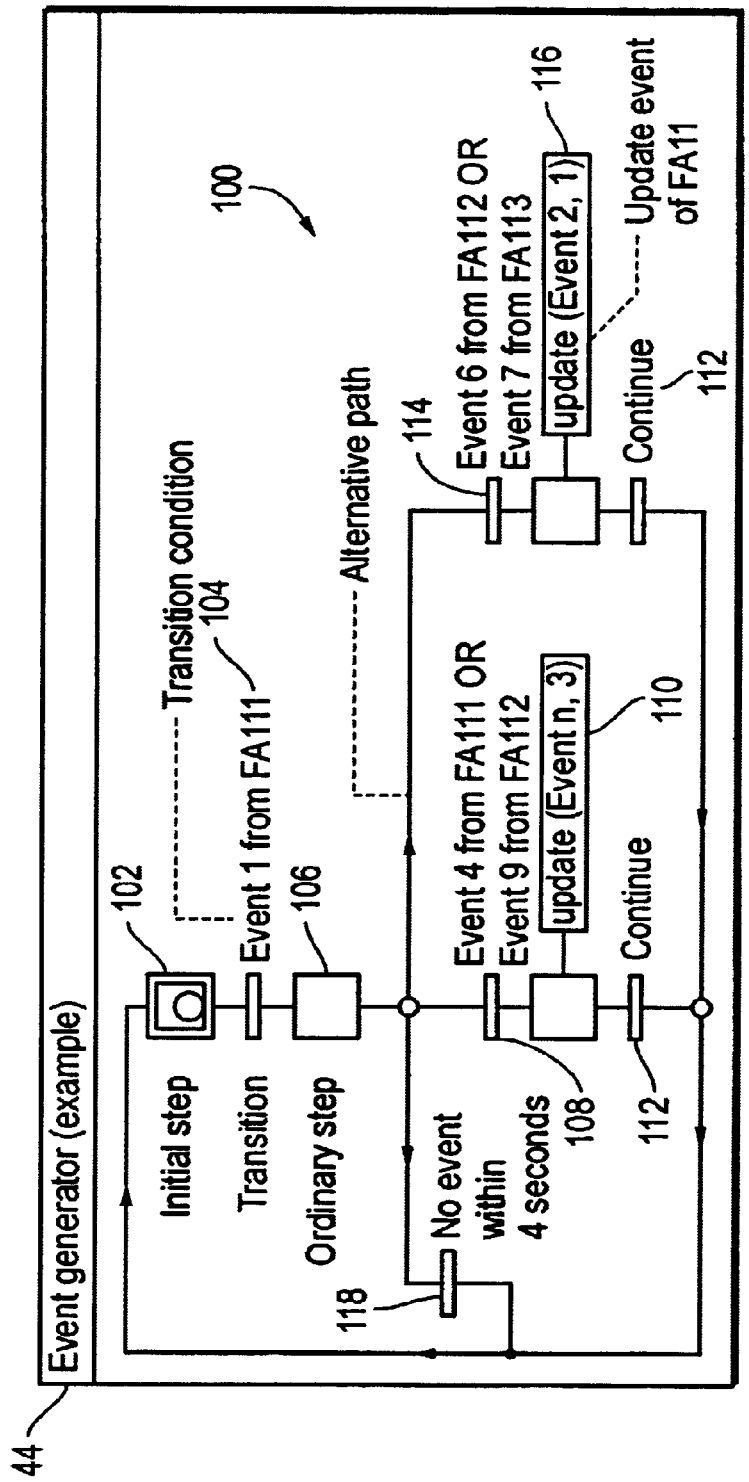
FIG. 3 is a an exemplary GRAFCET function chart which can be used in an event generator of an FA to implement the preferred embodiment of the present invention.

Referring now to FIG. 3, there is illustrated an exemplary GRAFCET function chart 100 which can be used in an event generator 44 of an FA 12 to implement the preferred embodiment of the present invention. As shown, a GRAFCET function chart 100 is composed primarily of steps (or states) and transitions, which are interconnected via directed links (unless marked otherwise, the flow is always from top to bottom). The steps can either be active (illustrated by a highlighted dot called a token) or inactive. Any number of control (configuration) actions can be associated with a step, but these actions are executed only when the step is active. In the case of an event generator 44 for an FA 12, for instance, the active step might cause an update of an event record in the event database 38. The change from an active to an inactive step is determined by the transition (or, rather the transition condition) located between the steps in question. In addition to steps and transitions, the GRAFCET formalism also includes special constructs for repetitions, and alternative paths as well as parallelism. The event generator 44 can handle any number of function charts 100 at the same time.

In FIG. 3, the event generator 44 of an FA 12 is illustrated as containing only a single GRAFCET function chart.100. At step 102, the normal mode of operation is to do nothing (stand by). At step 104, when the transition condition of an "Event 1 from FA111" is triggered, an ordinary step 106 is activated, whereupon the event generator 44 waits for another transition condition to be fulfilled.

At this point, three alternative paths, corresponding to three transition conditions, are available. If either "Event 4 from FA111" or "Event 9 from FA112" is triggered at step 108, then an ordinary "update" step 110 is activated, whereupon Event n is updated in the event database 38 with a new value, indicating that Event n has occurred. A "continue" transition 112 is then triggered and the process returns to the initial step 102. If after ordinary step 106, on the other hand, either "Event 6 from FA112" or "Event 7 from FA113" is triggered at step 114, then an ordinary "update" step 116 is activated, whereupon Event 2 is updated in the event database 38 with a new value. A "continue" transition 112 is then triggered and the process returns to the initial step 102. Finally, if neither of the aforementioned transition conditions 108 and 114 occurs within four seconds, in this case, then a "time-out" transition condition is triggered at step 118, and the process returns to the initial step 102.

Returning now to FIG. 2, when an update condition 108 or 114 is triggered in the event generator 44, the event generator 44 sends a message (as indicated at 46) to the event database 38, causing the event record for the generated event to be updated by changing the value of the value field and storing a new time in the time generated field. Whenever an event of an FA 12 is updated in the event database 38, the event dispatcher 40 is activated and the events are queued, as discussed above in connection with the subordinate FAs 12, one after another according to their priority and deadline. Thus, when Event n is generated in the FA11, it is transmitted via the event dispatcher to the requesting agent CA11, in accordance with the original subscription request (which was sent as indicated at 30). In this manner, the appropriate CAs 14 in the system 10 are able to request and receive alarm information (events), in response to which the receiving CA 14 is potentially able to take the necessary corrective actions.

Figure 4:
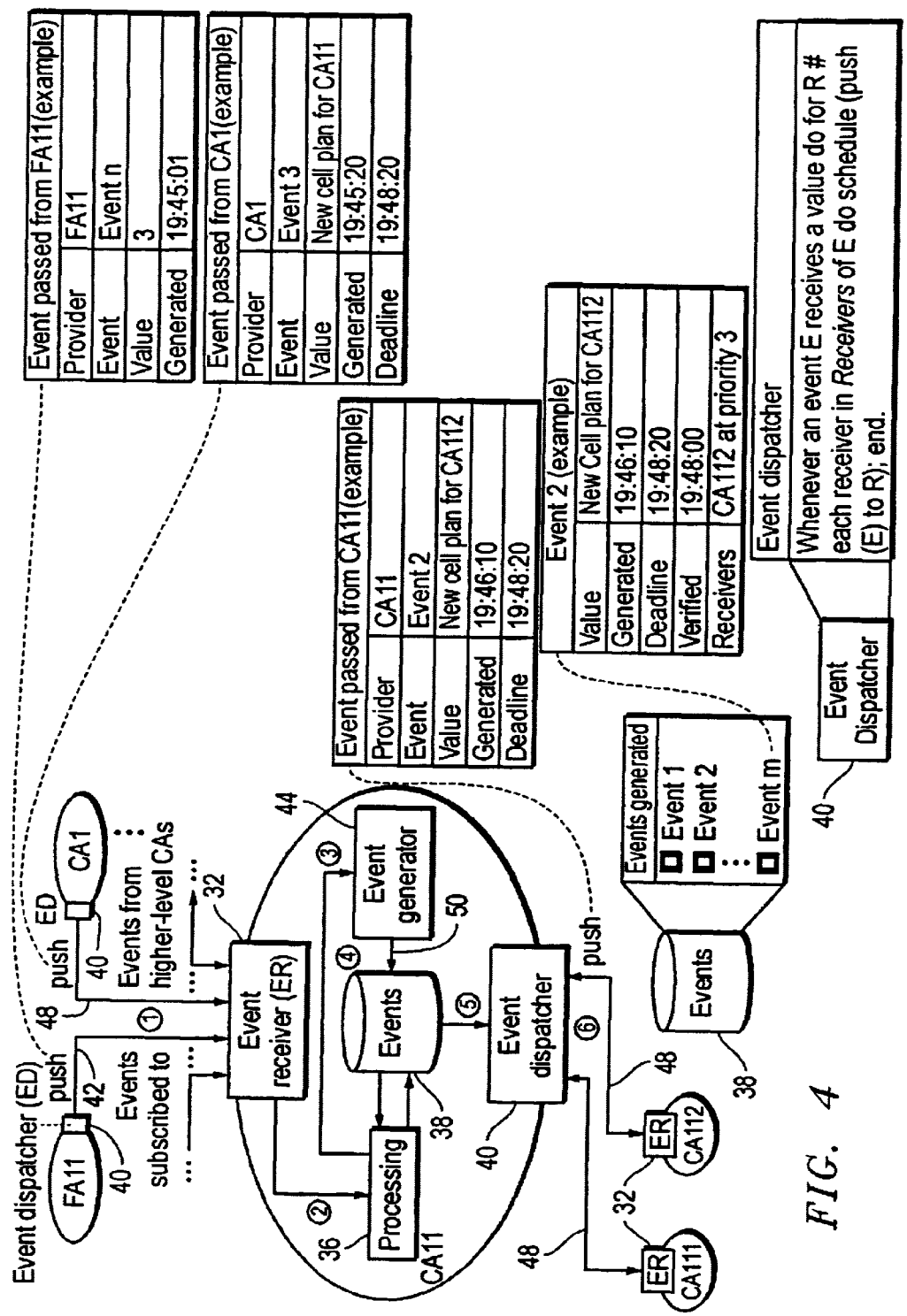
FIG. 4 is a diagram illustrating the preferred operation of a configuration agent (CA) in accordance with the present invention.

Referring now to FIG. 4, there is shown a diagram illustrating the preferred operation of a CA 14 in accordance with the present invention. Events are passed either from its associated FA 12 or other FAs 12 (as indicated at 42) or from a higher level CA 14 (as indicated at 48) to the CA11 via its event receiver 32, which acts as an interface to the interconnected FAs 12 and CAs 14. In this case, in addition to containing alarm information (as illustrated by the inset view of the event passed from the FA11), events can be associated with a set of arbitrary complex data; for example, an entire cell plan can be submitted through an event (as illustrated by the inset view of the event passed from the supervising CA1). Preferably, however, the amount of information in such a cell plan (or any other event) is kept at a minimum to save bandwidth by sending only high-level data that can be understood by subordinate CAs 14, which subsequently order more detailed configuration changes. In any event, the operation of the CAs 14 is preferably the same regardless of whether the event contains alarm data (from an FA 12) or configuration data (from a higher level CA 14) The following discussion, however, assumes that the received event contains configuration data from the supervising CA1.

As shown in the inset view of Event 3 passed from the CA1, the event data for a new cell plan differs from the event data for an alarm. For example, the event data includes: (1) an identifier of the provider (CA1 in this case); (2) a value, which can be a very complex data structure, identifying the new cell plan for the receiving CA 14; (3) a time at which the event was generated; and (4) a deadline for implementation of the new cell plan.

When an event is received by CA11, the event is immediately passed on to a processing unit 36 in CA11. The processing unit 36 checks to ensure that the event is valid (e.g., by accessing the events database 38), and if so, the event is forwarded to the event generator 44. The event generator 44 is responsible for carrying out all computations needed to submit proper configuration changes to the underlying CAs 14 and network resources 18. These computations can be relatively complex, especially for the generation or extraction of a new cell plan. As with the event generator 44 of the FAs 12, the GRAFCET formalism is preferably employed by the event generator 44 of the CAs 14 to structure these computations.

Figure 5:
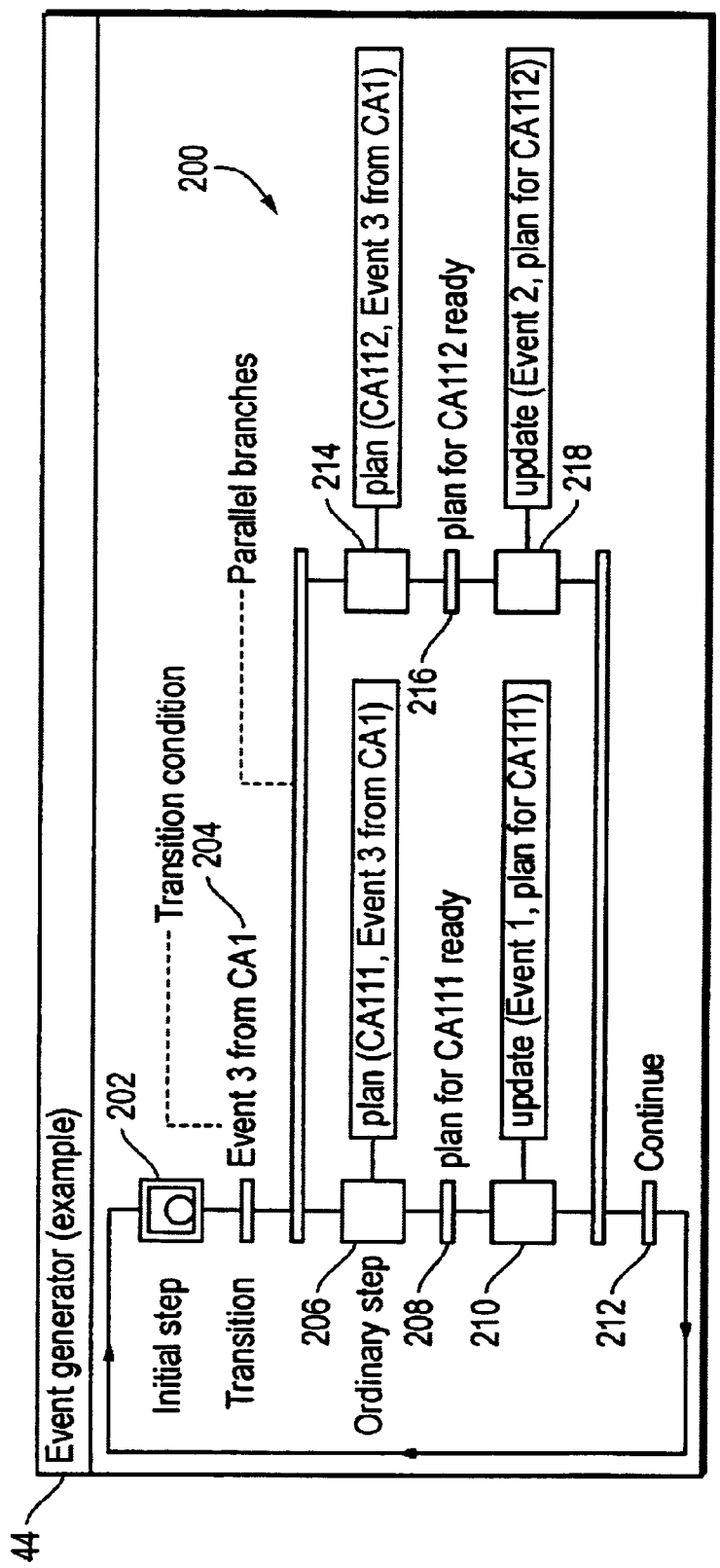
FIG. 5 is an exemplary GRAFCET function chart of an event generator that can be used in a CA in accordance with the preferred embodiment of the present invention.

For example, in FIG. 5 the event generator 44 is illustrated as containing an exemplary GRAFCET function chart 200 that can be used in a CA 14 in accordance with the preferred embodiment of the present invention. Although only one GRAFCET function chart 200 is illustrated in the event generator 44, the event generator 44 can handle any number of such function charts 200. At step 202, the normal mode of operation is to do nothing (stand by). At step 204, when the transition condition of "Event 3, from CA1" is triggered, steps 206 and 214 in two parallel branches are activated. In this case "Event 3 from CA1" represents a new cell plan for CA11, as depicted in FIG. 4, while each of the parallel branches corresponds to a respective one of the subordinate. CAs 14. Although the subordinate CA 14 case is illustrated in this example, it is also possible to perform the same functions in the underlying resource case.

As a result of the transition at step 204, an ordinary step 206 is activated, whereupon the event generator 44 develops a new plan for the subordinate CA111 that is in accordance with the higher level (less detailed) cell plan contained in Event 3 from the CA1. If a "plan ready for CA111" transition is triggered at step 208, then an "update" step 210 is activated, whereupon Event 1 is updated in the event database 38 with a new value, which contains the new cell plan for CA11. In the parallel branch, an ordinary step 214 is activated simultaneously with the step 206, whereupon the event generator 44 develops a new plan for the subordinate CA112 in accordance with the higher level (less detailed) cell plan contained in Event 3 from the CA1. If a "plan ready for CA112" transition is triggered at step 216, then an update step 218 is activated, whereupon Event 2 is updated in the event database 38 with a new value, which contains the new cell plan for the CA112. Once the updates of both parallel branches are complete, a continue transition 212 is then triggered and the process returns to the initial step 202.

Returning now to FIG. 4, when an update condition 208 or 214 is triggered in the event generator 44, the event generator 44 sends a message (as indicated at 50) to the event database 38, and new information is stored in the event record for the generated event. As illustrated in the inset view of Event 2, the event record includes: (1) a value field that contains the new cell plan data (for the subordinate CA112 in this case); (2) a time-stamp indicating when CA11 generated the more detailed cell plan; (3) a deadline by which time the cell plan must be implemented; (4) a time at which the implemented cell plan is verified (as further discussed below); and (5) an identification of the event receiver(s) 32 (the event receiver 32 that is associated with the subordinate CA112 in this case) to which the cell plan should be sent, along with priority information for the specified event receivers 32.

Whenever an event of a CA 14 is updated in the event database 38 (i.e., by storing a new cell plan), the event dispatcher 40 is activated and the events are queued one after another according to their priority and deadline. Thus, when Event 2 is generated in CA11, it is transmitted to the subordinate CA112 (as indicated at 48). In this manner, the CAs 14 in the system 10 are able to receive a high level cell plan, generate a new, more detailed cell plan for the subordinate CAs 14 and underlying resources 18, and transmit the new cell plan to the appropriate subordinate CAs 14 and resources 18. Similarly, with respect to received events that contain alarm data, the CAs 14 are able to evaluate the alarm, generate appropriate cell plans or other corrective measures, and transmit appropriate instructions to the subordinate CAs 14 and underlying resources 18 (as indicated at 48).

In an additional aspect of the invention, once the necessary reconfigurations have been implemented, the event receivers 32 in the subordinate CAs 14 and underlying resources 18 can notify the superior CA 14 (as indicated by the two-way arrow at 48) of the time when the ordered configuration changes were completed. This hand-shake mechanism provides a way to verify that the requested changes were actually carried out. If not, alternative solutions can then be generated by the CAs 14, using another function chart, or by extending the previously used function chart, to order alternative configuration actions after the deadline has passed.

Figure 6:
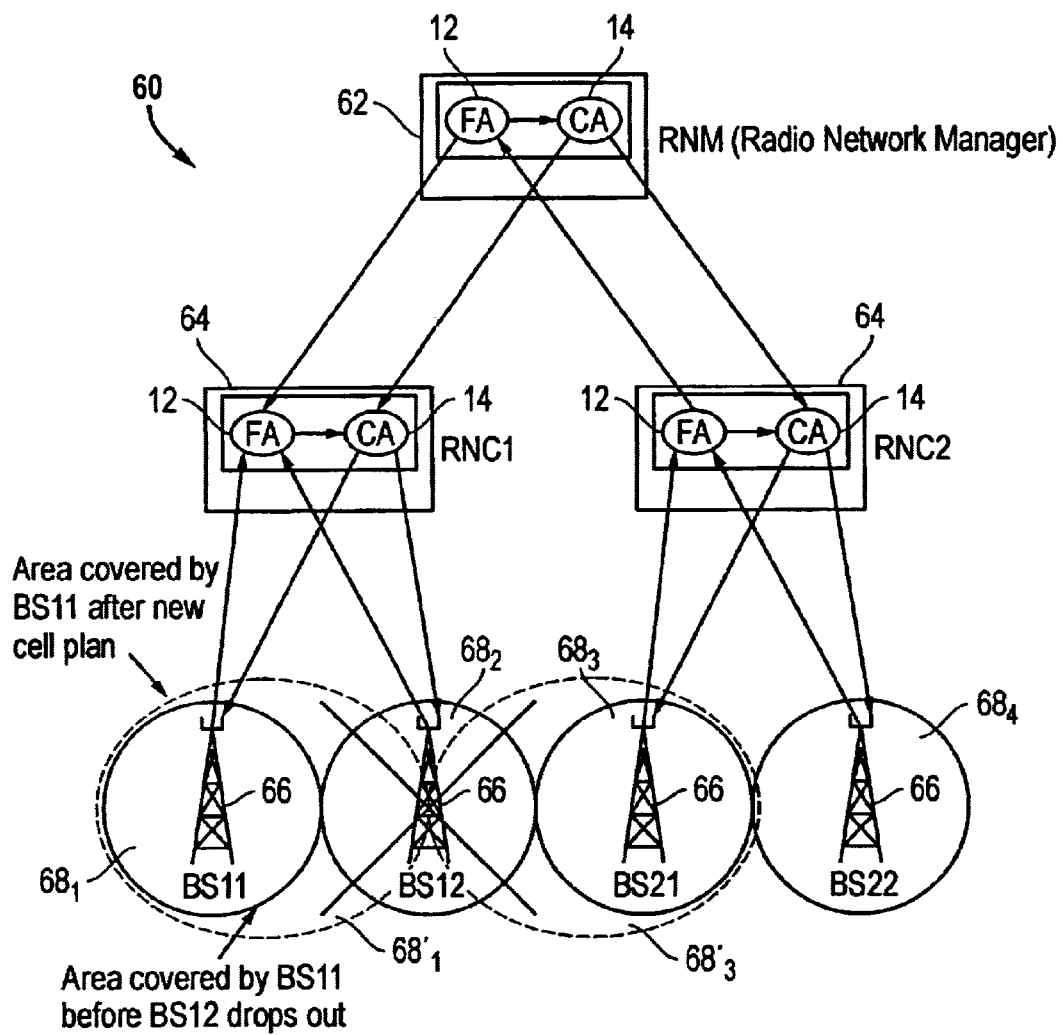
FIG. 6 is a cellular telecommunications network using the fault management architecture of the present invention.

Referring now to FIG. 6, there is illustrated a cellular telecommunications network 60 using the fault management architecture of the present invention. The cellular network 60 includes at least one Radio Network Manager (RNM) 62 (e.g., a mobile switching center), which oversees a plurality of Radio Network Controllers (RNCs) 64 (e.g., a base station controller). The RNCs 64, in turn, govern a number of subordinate base stations (BSs) 66, which each conduct radio communications in a corresponding cell 68 or number of cells 68. The RNM 62 and the RNCs 64 each include an FA-CA pair 16 for performing fault and configuration analysis. In this example, it is assumed that one of the base stations BS12 fails to operate properly, causing poor coverage in the corresponding cell $68_2$. As a result, a new cell plan is needed to temporarily solve the problem.

In accordance with the fault management architecture of the present invention, FA 12 in the RNM 62 sends individual subscription requests to the RNCs 64, to subscribe to certain alarm events in the respective RNCs 64. Each individual subscription request is sent once when it has been decided that a particular functionality should be activated. Then, potential problems in the network 60 associated with the particular functionality are constantly monitored until the subscription is canceled.

One of the alarm subscriptions in this example relates to whether BS12 is malfunctioning in some sense. The RNCs 64 also send subscription requests to the subordinate BSs 66. Once BS12 stops operating properly, the radio resource functions (not shown) in RNC1 detect problems reaching BS12 and send alarm signals to the local FA 12 of the RNC1. The FA 12 of RNC1 correlates (in an event generator 44) the received data to determine the cause of the alarms. The event generator 44 determines that the most probable cause is that BS12 is malfunctioning in some sense.

Because BS12 is at the border of the domain of the RNC1, however, the problem cannot be solved locally. Therefore, an alarm (indicating that BS12 is malfunctioning in some sense) is generated and passed to FA 12 of RNM 62, in accordance with the above-mentioned subscription request. FA 12 in the RNM 62 analyzes the incoming alarm signal and determines that the underlying problem can be handled at the RNM 62 level. The alarm (or a filtered variant of it) is therefore delivered to the associated CA 14, which is responsible for handling the problem.

The CA 14 of the RNM 62 realizes that the coverage problem can be resolved (at least partly) by a new cell plan for its managed domain. The CA 14 generates a new cell plan (using a function chart in the event generator 44, for example) and delivers high level cell plans to the CAs 14 of RNC1 and RNC2 for their respective domains. The CAs 14 of RNC1 and RNC2, in turn, generate more detailed instructions for implementing the high level cell plan and transmit these instructions to each of the affected network elements BS11 and BS21. It will further be appreciated that other network elements, such as BS22, might also be affected. For example, data such as the output power of the affected BSs 66 must be passed on to the BSs 66 so that the necessary adjustments can be made by the BSs 66. Other data, on the other hand, might be maintained at the RNC 64 level (thresholds for soft handover, for example). As a result of the new cell plan, BS11 is used to provide cellular coverage in expanded cell $68_1'$, while BS21 is used to provide cellular coverage in expanded cell $68_3'$. Thus, the network 60 is able to reconfigure the base stations 66 to provide at least a temporary solution for the break down of the base station BS12.

In this manner, the distributed fault management architecture of the present invention permits fault detection and fault correction in real-time. In other words, faults can be detected and addressed when they occur with any delays being limited by the specification of deadlines in the subscription requests. Because the architecture is distributed, it has numerous performance advantages over a centralized fault management system, such as a minimal drain on the communication bandwidth resources between the various levels in the system 60. In addition, the use of autonomous and "intelligent" agents 12 and 14 allows the system to be scalable, wherein additional levels can be added without causing a corresponding increase in the risk of overloading the bandwidth of the fault management system, by avoiding the situation in which all fault data must be passed to a centralized control node. Moreover, the distributed intelligence of the system 60 enables robust fault management handling. Flexibility can also be achieved by allowing the agents 12 and 14 to be interconnected in almost any way by using, for example, standard communication mechanisms such as CORBA.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A real time fault management system for a distributed communications network, comprising:

a plurality of network levels;

at least one fault agent associated with at least one of the network levels for detecting real time fault data associated with the distributed communications network;

at least one configuration agent associated with at least one of the network levels for controlling a configuration of at least a portion of the distributed communications network;

at least one data link for sending fault data from the at least one fault agent to the at least one configuration agent;

wherein, responsive to the real time fault data detected by the at least one fault agent having been generated by at least one subordinate fault agent, the at least one subordinate fault agent forwards information relative to the detected real time fault data; and wherein the forwarded information is forwarded to at least one fault agent that previously requested the forwarded information via a subscription request.

2. The real time fault management system of claim 1 comprising:

a plurality of communications nodes, wherein at least one communications node is located at each said network level;

a plurality of fault agents, each fault agent associated with one of the communications nodes; and a plurality of configuration agents, each configuration agent associated with one of the communications nodes.

3. The real time fault management system of claim 1 wherein a particular network level includes at least one fault agent and configuration agent pair.

4. The real time fault management system of claim 1 wherein the real time fault data detected by the at least one fault agent is generated by the at least one subordinate fault agent.

5. The real time fault management system of claim 4 wherein the at least one fault agent processes the real time fault data from the at least one subordinate fault agent to perform fault data correlation.

6. The real time fault management system of claim 4 wherein the at least one fault agent processes the real time fault data from the at least one subordinate fault agent to perform fault data filtering.

7. The real time fault management system of claim 4 wherein the at least one subordinate fault agent generates fault data in response to lower-level fault data generated by at least one lower level fault agent.

8. The real time fault management system of claim 1 wherein the real time fault data detected by the at least one fault agent is generated by at least one network resource associated with the at least one fault agent.

9. The real time fault management system of claim 1 wherein the at least one configuration agent generates control data in response to fault data forwarded from the at least one fault agent via the at least one data link.

10. The real time fault management system of claim 9 wherein the control data comprises instructions to reduce the effect of a detected fault.

11. The real time fault management system of claim 9 wherein the control data comprises cell plan data in a cellular telecommunications network.

12. The real time fault management system of claim 9 wherein the at least one configuration agent sends the generated control data to at least one subordinate configuration agent.

13. The real time fault management system of claim 12 wherein the at least one subordinate configuration agent processes the received control data to produce lower level control data.

14. The real time fault management system of claim 13 wherein the at least one subordinate configuration agent sends the lower level control data to a lower level configuration agent.

15. The real time fault management system of claim 13 wherein the at least one subordinate configuration agent sends the lower level control data to a network resource associated with the at least one subordinate configuration agent.

16. The real time fault management system of claim 1 wherein the distributed communications network comprises a distributed cellular telecommunications network.

17. The real time fault management system of claim 16 wherein at least one of the network levels comprises a radio network controller.

18. The real time fault management system of claim 16 wherein at least one of the network levels comprises a radio network manager.

19. The real time fault management system of claim 1 wherein the network levels are arranged in a hierarchy.

* * * * *